United States Patent [19]

Monauni et al.

[11] Patent Number: 5,033,495
[45] Date of Patent: Jul. 23, 1991

[54] CORROSION RESISTANT ENAMELED VALVE

[76] Inventors: Hanno L. Monauni, Schledstr. 20, 7107 Bad Wimpfen; Werner G. Kohler, Dorfstr. 46, D-372 Lutter; Reinhard Schertz, Bernhardspfad 8, D-6836 Oftersheim; Karl Weissmann, Kuhbrunnenweg 7, D-6836 Oftershiem, all of Fed. Rep. of Germany

[21] Appl. No.: 504,112

[22] Filed: Apr. 3, 1990

[30] Foreign Application Priority Data

Apr. 11, 1989 [EP] European Pat. Off. ......... 89106416.4

[51] Int. Cl.$^5$ .................................................. F16K 1/32
[52] U.S. Cl. ..................................... 137/74; 137/375; 251/144
[58] Field of Search .................. 137/74, 375; 251/368, 251/144

[56] References Cited

U.S. PATENT DOCUMENTS

| 2,454,160 | 11/1948 | Greene | 137/375 |
| 2,469,109 | 5/1949 | Goecke | 137/375 |
| 3,065,949 | 11/1962 | De Frees | 251/144 X |
| 4,557,286 | 12/1985 | Nagano | 137/74 |

FOREIGN PATENT DOCUMENTS 1238287 4/1967 Fed. Rep. of Germany .
7639732 12/1976 Fed. Rep. of Germany .
2481776 11/1981 France .
1038506 8/1966 United Kingdom .

OTHER PUBLICATIONS

Bhasin, Vinod, "How Safe are Fire-Safe Valves", Reprinted from *Chemical Processing*, Feb. 1990.

Primary Examiner—John C. Fox

[57] ABSTRACT

A fire and corrosion resistant enameled exteriorly sealing valve which may be mounted to a nozzle of a reaction vessel, comprising: a valve housing (1) having a valve opening therein, said housing being both internally enameled and enameled at said opening; a valve shaft (3) comprising a valve head (4) proximate one end thereof, said shaft and valve head being enameled on its outer surface; said valve head having a ground seat surface (4a) for mating with a housing seat surface (2a) at said opening provided at an extension (2, 21) of the valve housing (1); a stuffing box for the valve shaft (3), containing a packing (6, 7) out of material resistant to high temperatures; a spring package (17) engaging the valve shaft (3) and biasing the valve head (4) in a closed position, and by which a sufficiently high sealing force is provided between the two ground seat surfaces (2a, 4a) to maintain a seal in the presence of a fire; and said valve further comprising an actuation device (16) for opening and closing the valve.

11 Claims, 3 Drawing Sheets

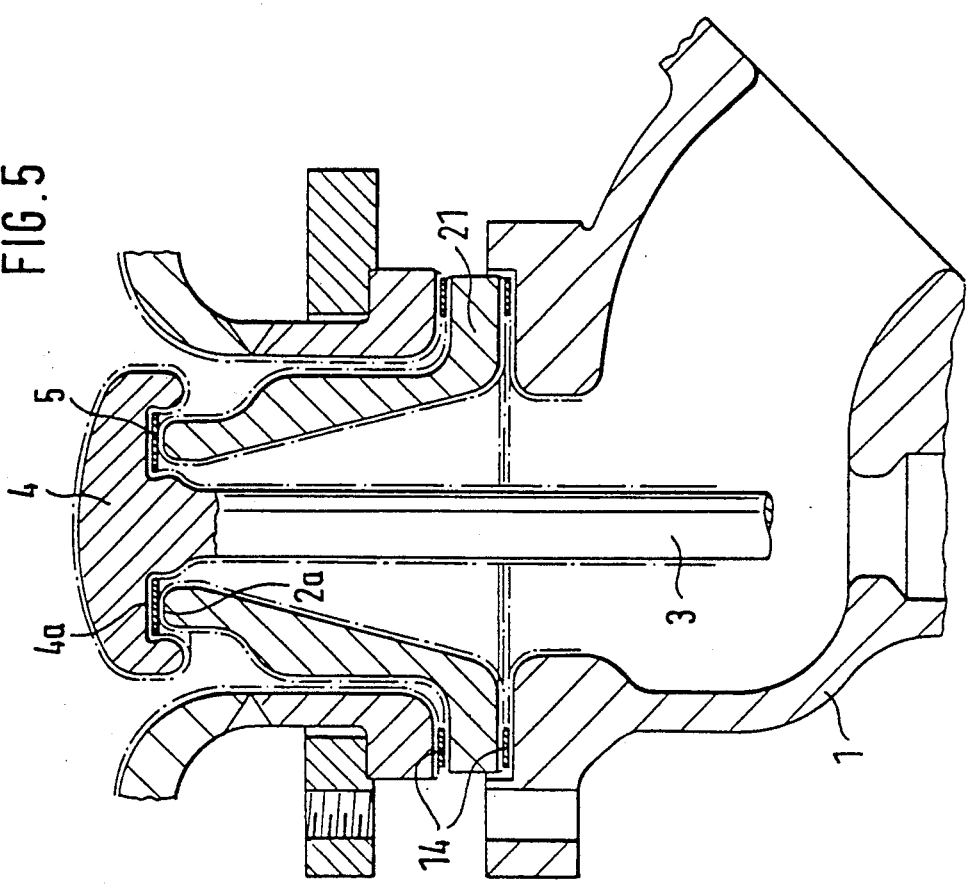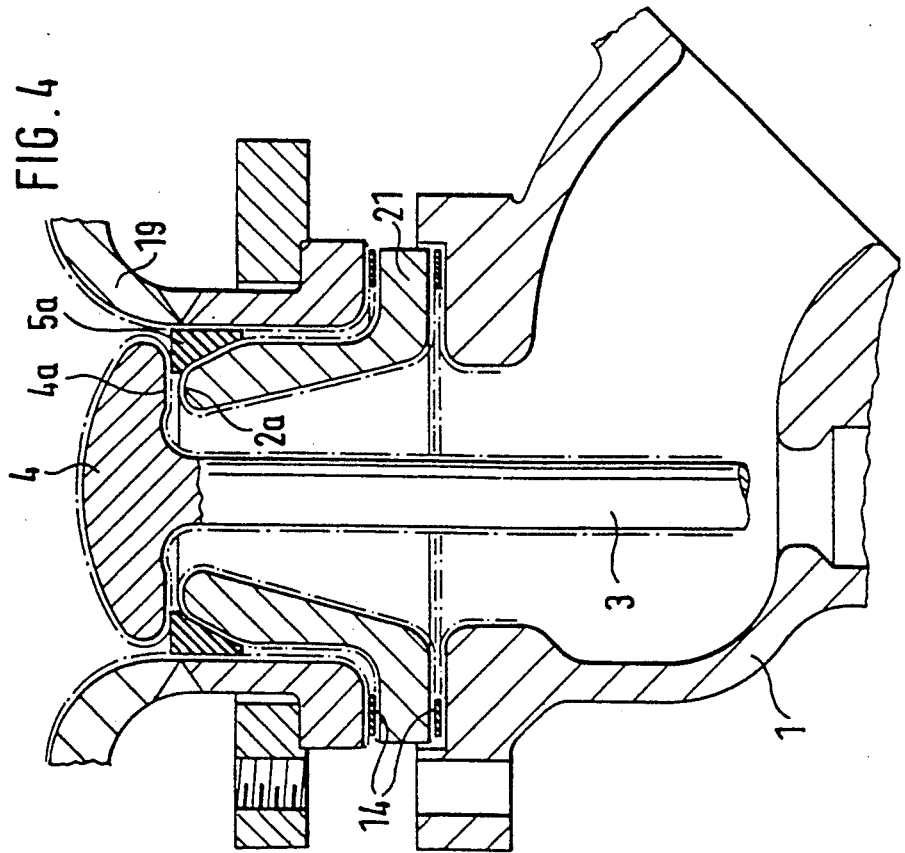

CORROSION RESISTANT ENAMELED VALVE

The invention is related to a corrosion resistant enameled valve which is adapted to be fixed to a nozzle of a vessel. Corrosion resistant enameled valves have been used in the chemical industries for many years which, for example, can be mounted as an outlet valve with outer sealing at an outlet nozzle of a vessel, or which together with a connection member can be used as a gate valve or a corner valve. Such valves can be provided with a valve head and a valve seat out of porcelain, both attached by cement. Two hand wheels may be provided, one of which may be for opening and closing and the other of which may be for lapping in the sealing seat surfaces.

Furthermore, enameled gate valves with inner sealing are known (German utility model 76 39 732), which can be designed rather sturdily and which can be run under vacuum or overpressure of 10 bar or more with an operation temperature of more than 200° C. Such valves are provided with an annular enameled seating surface and a valve head out of glass fiber reinforced PTFE, which is fixed and secured at an enameled valve shaft. For the valve head a straight guide can be provided, comprising a notch at the valve shaft into which a nose at the gland protrudes. Furthermore, the setting amount at the valve head can be compensated automatically by a package of plate springs.

In addition, inlet and outlet valves with outer sealing are known, in which at the valve housing a cylindrical extension out of glass fiber reinforced PTFE is provided, against the seat surface of which the valve head can be pressed by actuation of a hand wheel. The valve head as well as the valve shaft are enameled on the outer side.

Though PTFE can be advantageously used in the chemical industry as highly corrosion resistant material in connection with corrosion resistant enameling, in the case of extremely high temperatures the problem exists, that PTFE is flowing or finally melting, so that a sufficient sealing cannot be maintained. Therefore, toxic or corrosive media may leak out of the respective reaction vessel or pipe line, in which the valve is provided as a gate valve. Such extremely high temperatures may be caused if a plant catches fire. As an example, valves used in the petrochemical industry generally should fulfill conditions for fire-resistance and should fulfill certain test conditions (e.g. British Standard Testing of Valves BS 6755). The above mentioned known enameled valves do not allow maintaining, in the case of a fire, a sufficiently long sealing time, since PTFE melts at temperatures commonly encountered during fires. It is therefore the object of the invention to provide for a corrosion resistant enameled gate- and/or outlet valve, which not only provides dependable sealing in the regions of normally allowable operation temperatures and pressures, but which, in case of fire, also permits sufficient sealing for an extended period of time.

SUMMARY OF THE INVENTION

Therefore, in the case of the invention a corrosion resistant enameled exteriorly sealing valve is provided, which can be mounted at the nozzle of a reaction vessel and which achieves in the case of a fire, sufficient sealing for an extended period of time. The valve comprises: a valve housing having a valve opening therein, the housing being both internally enameled and enameled at its opening. The valve also includes a valve shaft comprising a valve head proximate one end thereof, the shaft and head being enameled on its outer surface. The head comprises a ground seat surface for mating with a housing ground seat surface at the opening at an extension of the valve housing. A stuffing box is provided for the valve shaft, which stuffing box comprises a packing out of material resistant to high temperatures. A package out of plate springs engages the valve shaft which package biases the valve head in the closed position and which also provides good sealing between the ground seat surfaces in the case of a fire. Furthermore, an actuation device for opening and closing of the valve is provided. Advantageous further improvements and specific embodiments of the invention are subject of the subclaims.

The invention is based on the recognition, that the use of the advantageous properties of PTFE can be maintained at normal operation temperatures, if sealingly fitting ground sealing surfaces are provided on the underside of the enameled valve head and the upper side of the enameled cylindrical extension, so that e.g. by the use of a sleeve-type gasket out of PTFE a very good sealing can be achieved during normal operation, which sealing can even then be maintained if, in the case of a fire, extremely high temperatures are caused and the sealing material out of PTFE is melting. In such a case the sealing is provided by the direct engagement of the two correspondingly shaped ground seat surfaces for an extended period of time. "Extended period of time" as used herein means a longer period of time than prior art valves wherein the valve would fail when PTFE sealing parts melted or decomposed. Even if in the case of a fire the temperature should increase over about 500° C., at first only softening and fusing of the enamel layers in the region of the two ground seat surfaces takes place. Since temperatures of 500° C. or more are seldom caused in the case of a fire, the ground seat surfaces can be removed rather easily from each other upon cooling, in order to fully open the valve. However, even if the enamel layers along the two seat surfaces are totally fused along a length of the two seat surfaces, tools normally available can be used to fully open the valve without substantial difficulties because of the outer sealing design. The invention will be further described in connection with embodiments thereof, with reference being made to the accompanying drawings,

BRIEF DESCRIPTION OF THE DRAWINGS

FIGS. 2 to 5 illustrate modifications of the embodiment shown in FIG. 1, but omit the lower part of the complete valve as shown in FIG. 1.

DETAILED DESCRIPTION OF THE INVENTION

Figure 1:
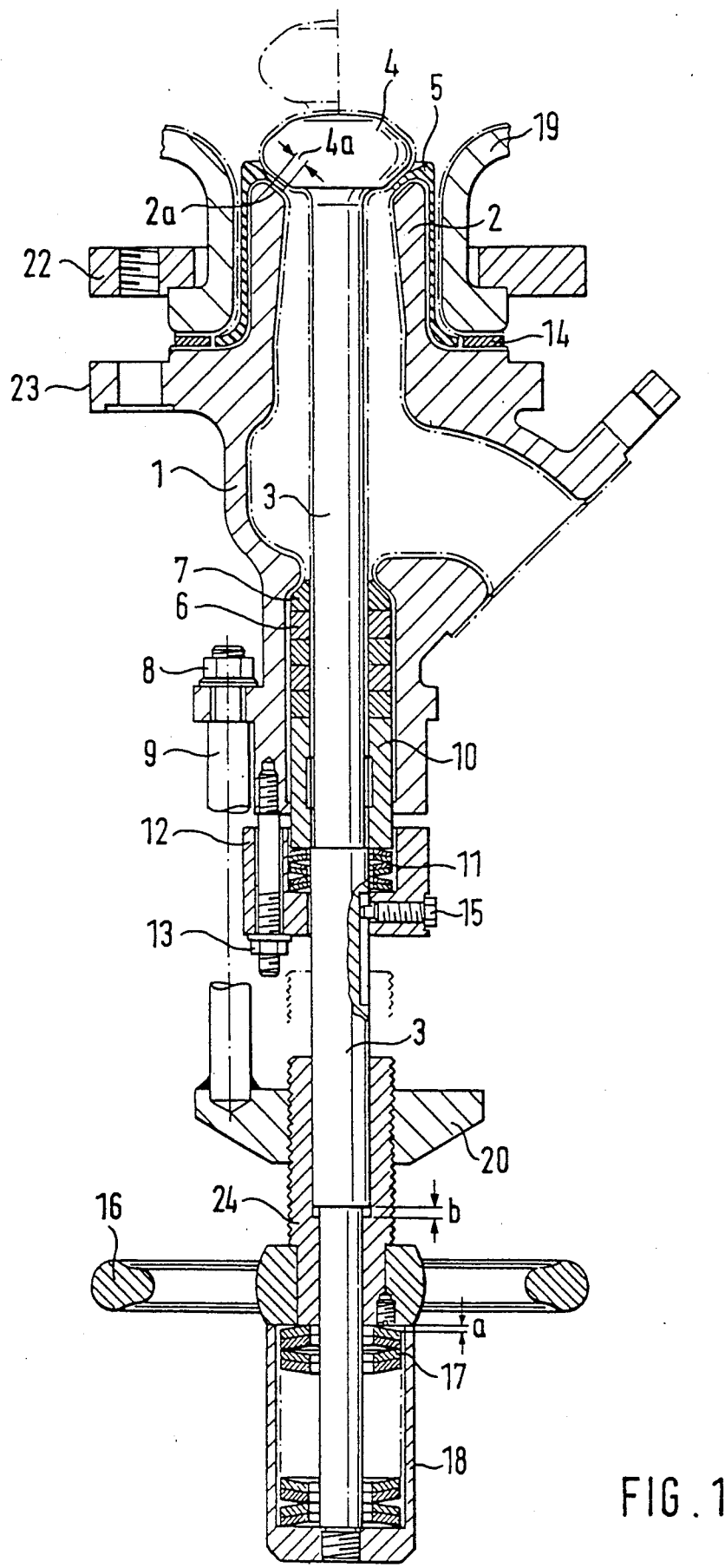
FIG. 1 is a longitudinal sectional view of an enameled valve embodying the invention.

The embodiment in FIG. 1 shows a corrosion resistant enameled valve with outer sealing, having a housing 1. The valve is mounted at a nozzle 19 of a reaction vessel and provides sufficient sealing for an extended time period in the case of a fire. Housing 1 is enameled along its inner walls and a valve shaft 3 enameled on its outer surface having an enameled valve head 4 is provided. The valve head 4 has a ground seat surface 4a, which is formed with an annular shape on the underside of the valve head 4 and has a width of e.g. 3 mm.

In this embodiment an enameled cylindrical extension 2 is provided as a single unit with the valve housing 1 enameled on its inner surface and a seating surface. The inner diameter of the cylindrical extension 2 decreases towards its free (open) end in such a manner, that on its upper surface a seat surface 2a can be ground, which is complementary to the conical annular shape of the seat surface 4a on the lower side of the valve head 4. The upper end of a sleeve-type gasket 5 out of PTFE is held between the two seat surfaces 2a and 4a. The lower end of the gasket is held between the enameled surfaces on the inner wall of the outlet nozzle 19 and the outer surface of the enameled extension 2, so that this gasket cannot fall out upon opening the valve. Between the flange surfaces of the outlet nozzle 19 and the connection flange 23 of the valve housing 1 a corrosion resistant gasket or seal 14 out of graphite is arranged, which is resistant against higher temperatures as is the gasket 5 out of PTFE. Fixing of the valve at the outlet nozzle 19 is performed by means of flange 22.

The valve shaft 3 is sealed against the outside by a stuffing box, which comprises packing rings 6 and a base ring 7. The packing rings 6 preferably consist of temperature resistant graphite. By means of a connection piece 12 which is screwed by a screw connection 13 with the lower end of the valve housing, a gland 10 may be pressed against the packing of the stuffing box.

Underneath the stuffing box a guiding groove is provided along the valve shaft 3, into which groove a guide 15 projects which guide is fixed to the valve housing 1. In this manner sealing always takes place in the same relative rotational position between valve head 4 and extension 2. An actuation device may be provided for opening and closing the valve e.g. a pneumatic actuation device or a manual actuation device in the form of a hand wheel.

In the shown embodiment as an actuation device, a hand wheel 16 is provided, which is connected with the threaded spindle 24. The threaded spindle 24 is moved in a flange 20 with an inner thread. This flange 20 is locked in position relative to the valve housing 1 by bolts 9 with nuts 8. Furthermore, a plate spring package 17 is arranged in a protective housing 18. If the valve is closed as shown in FIG. 1, the gap a=0 and the springs of the spring plate package are biased. In the case of setting of the sleeve-type gasket 5 the valve shaft 3 is biased by the springs of the spring package 17 in the threaded spindle 24 downwardly until the distance b=0.

If a fire breaks out and if the temperature of the material of the gasket 5 out of PTFE increases to more than e.g. 600° C., the sealing material will melt between the two sealing surfaces 2a and 4a, so that then the ground enamel surfaces come into a sealing engagement maintaining the dependable sealing. This sealing effect is improved by softening or fusing of the enamel at the sealing surfaces 2a and 4a.

Figure 2:
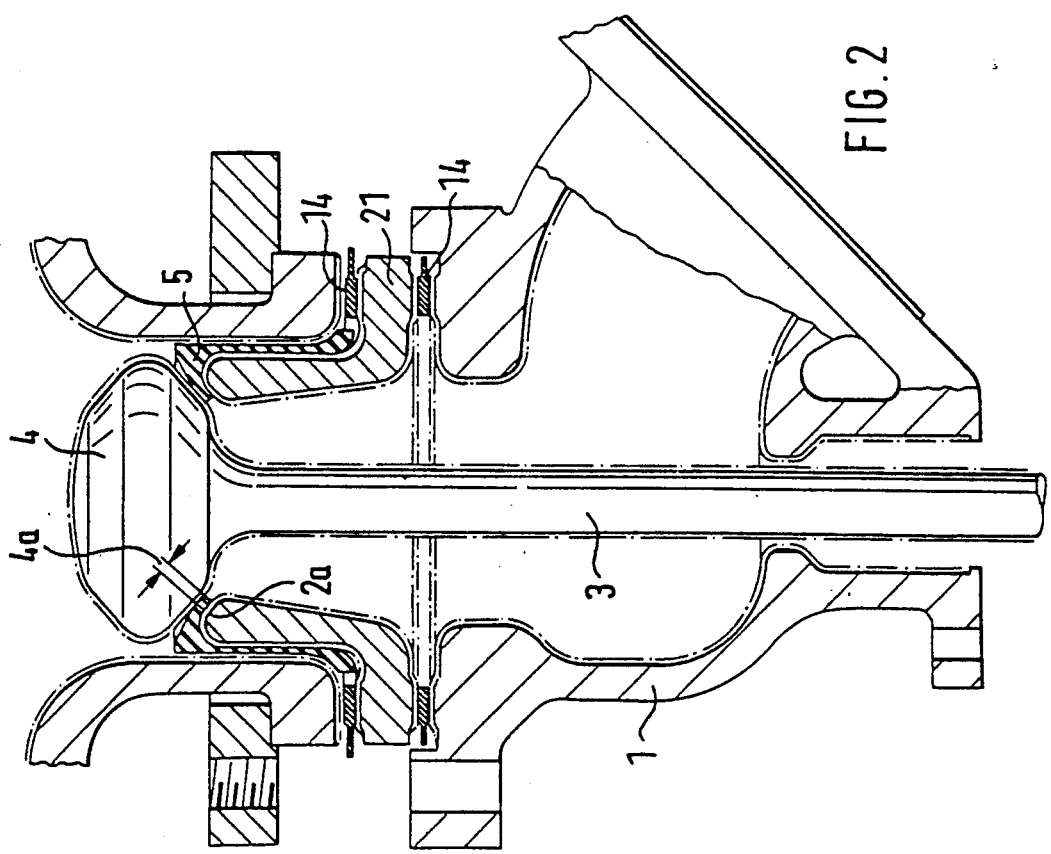

The embodiment shown in FIG. 2 differs from the embodiment shown in FIG. 1 in that instead of the extension 2 which is unitary in FIG. 1 with the valve housing, an extension 21 in the form of a mounting element with a flange is provided. Therefore in this embodiment two gaskets 14 out of graphite are provided. The sleeve-type gasket 5 out of PTFE may be shaped as in the first embodiment. The advantage of the use of a separate extension 21 is to be seen in the fact, that then a standard-valve housing 1 may be used.

Figure 3:
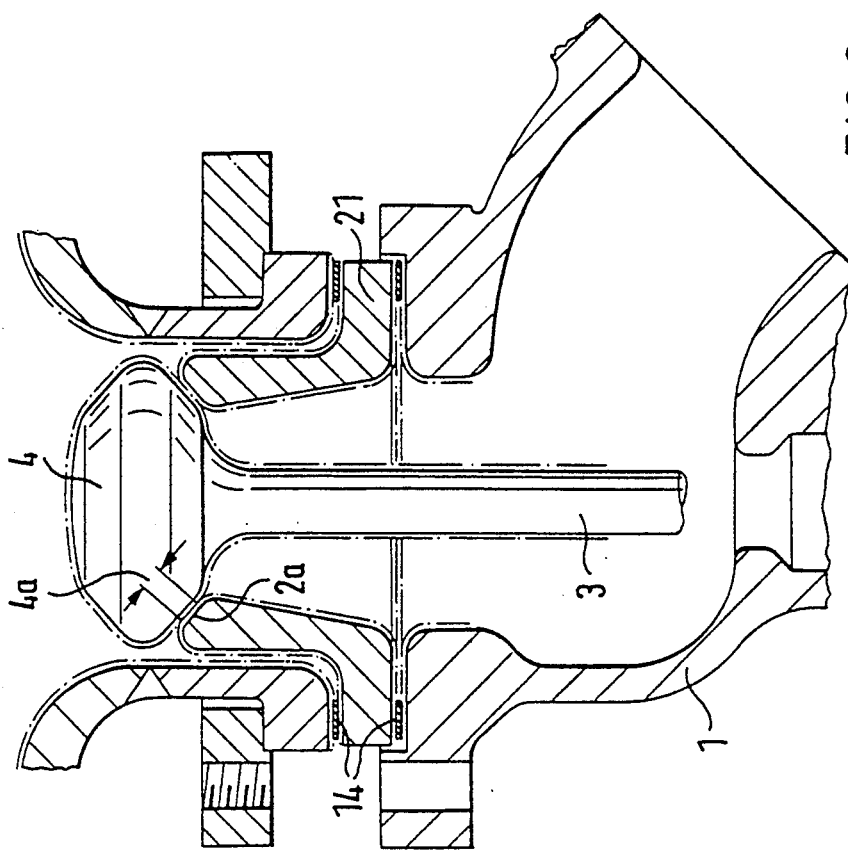

The embodiment shown in FIG. 3 differs from the embodiment shown in FIG. 2 in that the two annular sealing surfaces 2a, 4a have a larger width, and may have a width of about 7 mm, so that also in a normal operation in principle the use of a gasket 5 out of soft material like PTFE would not really be necessary. However, in order to achieve a very good sealing during normal operation it is regularly advantageous to provide between the sealing surfaces 2a and 4a a soft gasket.

In the case of the embodiment as shown in FIG. 4 the valve head 4 is provided on its underside with a plane region, so that a plane annular sealing surface 4a can be ground. The upper side of the extension 21 is formed in such a manner, that a plane sealing surface 2a can also be ground, so that a dependable sealing by abutment of the two seat surfaces 2a, 4a can be achieved in the case of a fire. In this embodiment a rather simple and inexpensive gasket ring 5a out of PTFE can be provided, which is compressed in a sealing manner between the underside of the valve head 4, the upper outer surface of the extension 21 and the inner wall of the nozzle 19. In this embodiment the seat surfaces 2a, 4a only come into a sealing contact in the case of a fire, as soon as the material of the gasket 5a flows and melts.

In the case of the embodiment as shown in FIG. 5, as gasket 5, a simple ring disk out of PTFE can be provided. However, in this case it is necessary to form the underside of the valve head 4 in the region of the ground seat surface 4a in such a manner, that the shown cross section of the groove is provided, so that the gasket 5 cannot fall out if the valve is opened. Furthermore, in the case of this embodiment it is also necessary, in a similar manner as in the embodiment as shown in FIG. 4, to provide such a shape of the extension at the upper end, that in FIG. 4 the gasket ring 5a can be arranged on the outside of the extension 21, whilst in FIG. 5 a corresponding space is necessary for the outer region on the underside of the valve head 4.

What is claimed is:

1. A fire and corrosion resistant exteriorly enameled sealing valve suitable for mounting on a nozzle of a reaction vessel, comprising:
   a valve housing having a valve opening therein, said housing being both internally enameled and enameled at said opening;
   a valve shaft comprising a valve head proximate one end thereof, said shaft and valve head being enameled on its outer surface, said valve head having an enameled ground seat surface for mating with an enameled housing ground seat surface at said opening provided at a cylindrical extension of the valve housing;
   a gasket of soft material arranged between the two ground seat surfaces, which material flows or melts at a high temperature;
   a stuffing box for the valve shaft, containing a packing comprised of high temperature resistant material;
   a spring package operatively arranged to engage the valve shaft and bias the valve head in a closed position, wherein a sufficiently high sealing force is provided between the two ground seat surfaces and gasket to maintain a seal in the presence of a fire.

2. The enameled sealing valve as recited in claim 1, and further comprising an actuation device for opening and closing the valve.

3. The enameled sealing valve as recited in claim 1 wherein the cylindrical extension is unitary with the valve housing.

4. The enameled sealing valve as recited in claim 1 wherein the cylindrical extension is a mounting element provided with a flange.

5. The enameled sealing valve as recited in claim 1 wherein said cylindrical extension has an inner diameter which decreases to said opening in such a manner that the seat surface on the upper side of the extension can be shaped in a manner which complements a plane or conical annular shape of the seat surface on the underside of the valve head.

6. The enameled sealing valve as recited in claim 1, including a second spring package adapted to compensate the setting amounts of stuffing box packing in the case of higher temperatures.

7. The enameled sealing valve as recite din claim 1 wherein the gasket comprises a gasket ring arranged radially outwardly of the two ground seat surfaces to seal between the ground seat surfaces and between the nozzle and the valve housing.

8. The enameled sealing valve as recited in claim 7 wherein said gasket ring is made of polytetrafluorethylene.

9. The enameled sealing valve as recited in claim 1 wherein along said valve shaft a guidance groove is provided, into which a pin mounted at said valve housing protrudes to prevent shaft rotation.

10. The enameled sealing valve as recited in claim 1 wherein said nozzle includes a flange surface and said valve housing includes a connection flange and the valve further comprises a graphite gasket between said nozzle flange surface and said housing connection flange.

11. The enameled sealing valve as recited in claim 1 wherein said stuffing box comprises graphite packing rings.

\* \* \* \* \*